(12) United States Patent
Nakamura

(10) Patent No.: US 9,840,164 B2
(45) Date of Patent: Dec. 12, 2017

(54) ELECTRIC VEHICLE

(71) Applicant: SUZUKI MOTOR CORPORATION, Hamamatsu-Shi, Shizuoka-Ken (JP)

(72) Inventor: Yuta Nakamura, Hamamatsu (JP)

(73) Assignee: SUZUKI MOTOR CORPORATION (JP)

( * ) Notice: Subject to any disclaimer, the term of this patent is extended or adjusted under 35 U.S.C. 154(b) by 0 days.

(21) Appl. No.: 15/335,545

(22) Filed: Oct. 27, 2016

(65) Prior Publication Data

US 2017/0113568 A1   Apr. 27, 2017

(30) Foreign Application Priority Data

Oct. 27, 2015   (JP) .................................. 2015-210401

(51) Int. Cl.
*B60L 15/00* (2006.01)
*B62K 11/02* (2006.01)
(Continued)

(52) U.S. Cl.
CPC .............. *B60L 15/007* (2013.01); *B60K 1/00* (2013.01); *B60K 1/04* (2013.01); *B60K 7/0007* (2013.01); *B62K 11/02* (2013.01); *B60K 2007/0038* (2013.01); *B60K 2007/0092* (2013.01); *B60L 2210/10* (2013.01); *B60L 2210/40* (2013.01); *B60Y 2200/126* (2013.01); *B60Y 2200/91* (2013.01); *B60Y 2306/05* (2013.01); *B60Y 2400/202* (2013.01)

(58) Field of Classification Search
CPC .............. B60L 15/007; B60L 2210/10; B60L 2210/40; B60K 1/00; B60K 1/04; B60K 1/003; B60K 6/20; B60K 6/22; B60K 6/42; B60K 2007/0038; B60K 2007/0092; B60K 11/06; B62K 11/02; B60Y 2200/91; B60Y 2200/126
See application file for complete search history.

(56) References Cited

U.S. PATENT DOCUMENTS 5,757,624 A * 5/1998 Kawaguchi ............... B60L 1/14
307/9.1
6,037,726 A * 3/2000 Tabata .................. B60K 7/0007
180/65.8
(Continued)

FOREIGN PATENT DOCUMENTS

JP   2002187587 A   7/2002

*Primary Examiner* — Erez Gurari
(74) *Attorney, Agent, or Firm* — Barnes & Thornburg LLP

(57) ABSTRACT

An electric vehicle capable of efficiently and reliably cooling a power converter disposed inside an exterior. An electric vehicle includes a frame extending in a longitudinal direction, a power converter being long in the longitudinal direction along the frame, and an exterior extending in the longitudinal direction to cover the frame and the power converter, the exterior defining a cooling air path between the power converter to allow cooling air to flow through the cooling air path along the longitudinal direction. The power converter extends in the longitudinal direction in the cooling air path, and includes a plurality of heat radiation fins protruding toward an inner surface of the exterior, and the exterior includes an air induction port provided at a front end of the cooling air path to allow travelling wind to flow into the cooling air path.

8 Claims, 11 Drawing Sheets

(51) Int. Cl.
*B60K 1/00* (2006.01)
*B60K 1/04* (2006.01)
*B60K 7/00* (2006.01)

(56) References Cited

U.S. PATENT DOCUMENTS

| | | | | |
|---|---|---|---|---|
| 6,047,786 A * | 4/2000 | Stevenson | ............ | B62K 11/10 180/65.1 |
| 9,327,586 B2 * | 5/2016 | Miyashiro | ............ | B60K 1/04 |
| 9,327,658 B2 * | 5/2016 | Watanabe | ............ | B60R 16/02 |
| 9,638,076 B2 * | 5/2017 | Nitta | ............ | F01M 1/16 |
| 9,660,236 B2 * | 5/2017 | Kondo | ............ | H01M 2/1083 |
| 2005/0067201 A1 * | 3/2005 | Ozeki | ............ | B60K 6/40 180/65.25 |
| 2011/0036657 A1 * | 2/2011 | Bland | ............ | B62K 11/06 180/220 |
| 2011/0061960 A1 * | 3/2011 | Matsuoka | ............ | B62K 11/10 180/220 |
| 2012/0103710 A1 * | 5/2012 | Atsuchi | ............ | B60K 1/04 180/65.31 |
| 2012/0103716 A1 * | 5/2012 | Fujihara | ............ | B60L 11/1877 180/220 |
| 2012/0118659 A1 * | 5/2012 | Shinde | ............ | B62K 5/025 180/291 |
| 2012/0247856 A1 * | 10/2012 | Shinde | ............ | B60K 1/04 180/216 |
| 2013/0264134 A1 * | 10/2013 | Matsuda | ............ | B60K 1/04 180/68.1 |
| 2013/0270940 A1 * | 10/2013 | Matsuda | ............ | B62K 11/04 310/64 |
| 2013/0319782 A1 * | 12/2013 | Matsuda | ............ | B62K 11/04 180/220 |
| 2014/0015656 A1 * | 1/2014 | Shimizu | ............ | B62J 3/00 340/425.5 |
| 2015/0122562 A1 * | 5/2015 | Miyashiro | ............ | B62M 6/90 180/68.5 |
| 2015/0122563 A1 * | 5/2015 | Kondo | ............ | B62M 6/90 180/68.5 |
| 2015/0122569 A1 * | 5/2015 | Miyashiro | ............ | B60L 11/1822 180/220 |
| 2015/0122570 A1 * | 5/2015 | Miyashiro | ............ | B60K 1/04 180/220 |
| 2015/0258898 A1 * | 9/2015 | Matsuda | ............ | B60L 7/14 701/22 |
| 2015/0344093 A1 * | 12/2015 | Inoue | ............ | B62M 7/04 180/220 |
| 2016/0152295 A1 * | 6/2016 | Cervino | ............ | G09F 13/04 180/219 |
| 2016/0280306 A1 * | 9/2016 | Miyashiro | ............ | B62K 11/04 |
| 2016/0318580 A1 * | 11/2016 | Miyashiro | ............ | B60L 11/1803 |

* cited by examiner

ELECTRIC VEHICLE

CROSS-REFERENCE TO RELATED APPLICATIONS

This application claims the benefit of priority of Japanese Patent Application No. 2015-210401, filed on Oct. 27, 2015, the entire contents of which are incorporated herein by reference.

BACKGROUND OF THE INVENTION

Field of the Invention

The present invention relates to an electric vehicle.

Description of the Related Art

There is known a fuel cell motorcycle in which a power converter, or specifically a DC-DC converter, is connected between a fuel cell and an electric motor, and output of the electric motor is transmitted to a rear wheel.

This conventional fuel cell motorcycle includes a DC-DC converter disposed on any one of right and left sides of a rear wheel (e.g. refer to Patent Document 1 (Japanese Patent Laid-Open No. 2002-187587)).

SUMMARY OF THE INVENTION

The conventional fuel cell motorcycle includes the DC-DC converter provided along with a frame inside an exterior with which the frame is covered, and the fuel cell, the DC-DC converter, and an electric motor controller are cooled by travelling wind passing through the inside of the exterior during travelling.

Unfortunately, the conventional fuel cell motorcycle only allows heat radiation fins provided in the DC-DC converter to be exposed to travelling wind passing through the inside of the exterior. Such an exterior structure of the DC-DC converter cannot allow a sufficient amount of air to flow between the heat radiation fins in which air resistance increases as compared with the periphery of the DC-DC converter, and contrarily allows air to detour in the periphery of the DC-DC converter so as to avoid the heat radiation fins, thereby deteriorating in cooling efficiency.

To solve the problems described above, it is an object of the present invention to provide an electric vehicle capable of efficiently and reliably cooling a power converter disposed inside an exterior.

To achieve above object, an aspect of the present invention provides an electric vehicle according to the present invention including a frame extending in a longitudinal direction, a power converter that is long in the longitudinal direction along the frame, an exterior that extends in the longitudinal direction to cover the frame and the power converter, and that defines a cooling air path for the power converter to allow cooling air to flow the cooling air path along the longitudinal direction. The power converter extends in the longitudinal direction in the cooling air path, and has a plurality of heat radiation fins protruding toward an inner surface of the exterior. The exterior includes an air induction port that is provided at a front end of the cooling air path to allow travelling wind to flow into the cooling air path.

This electric vehicle is capable of efficiently and reliably cooling a power converter disposed inside an exterior.

DETAILED DESCRIPTION OF THE PREFERRED EMBODIMENTS

Hereinafter, an embodiment of an electric vehicle according to the present invention will be described with reference to FIGS. 1 to 11.

Figure 1:
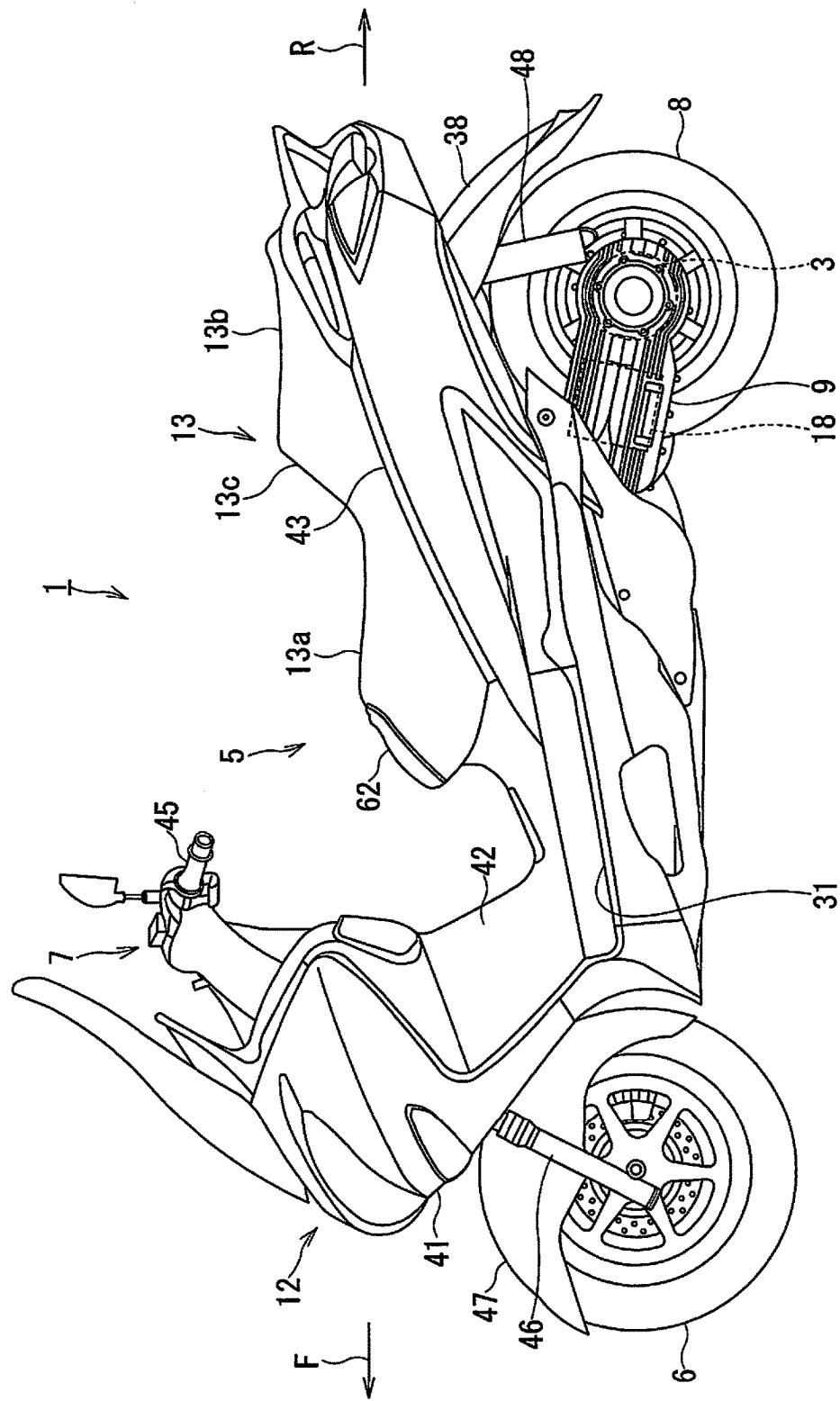
FIG. 1 is a left side view of an electric vehicle according to an embodiment of the present invention.

FIG. 1 is a left side view of the electric vehicle according to the embodiment of the present invention.

Figure 2:
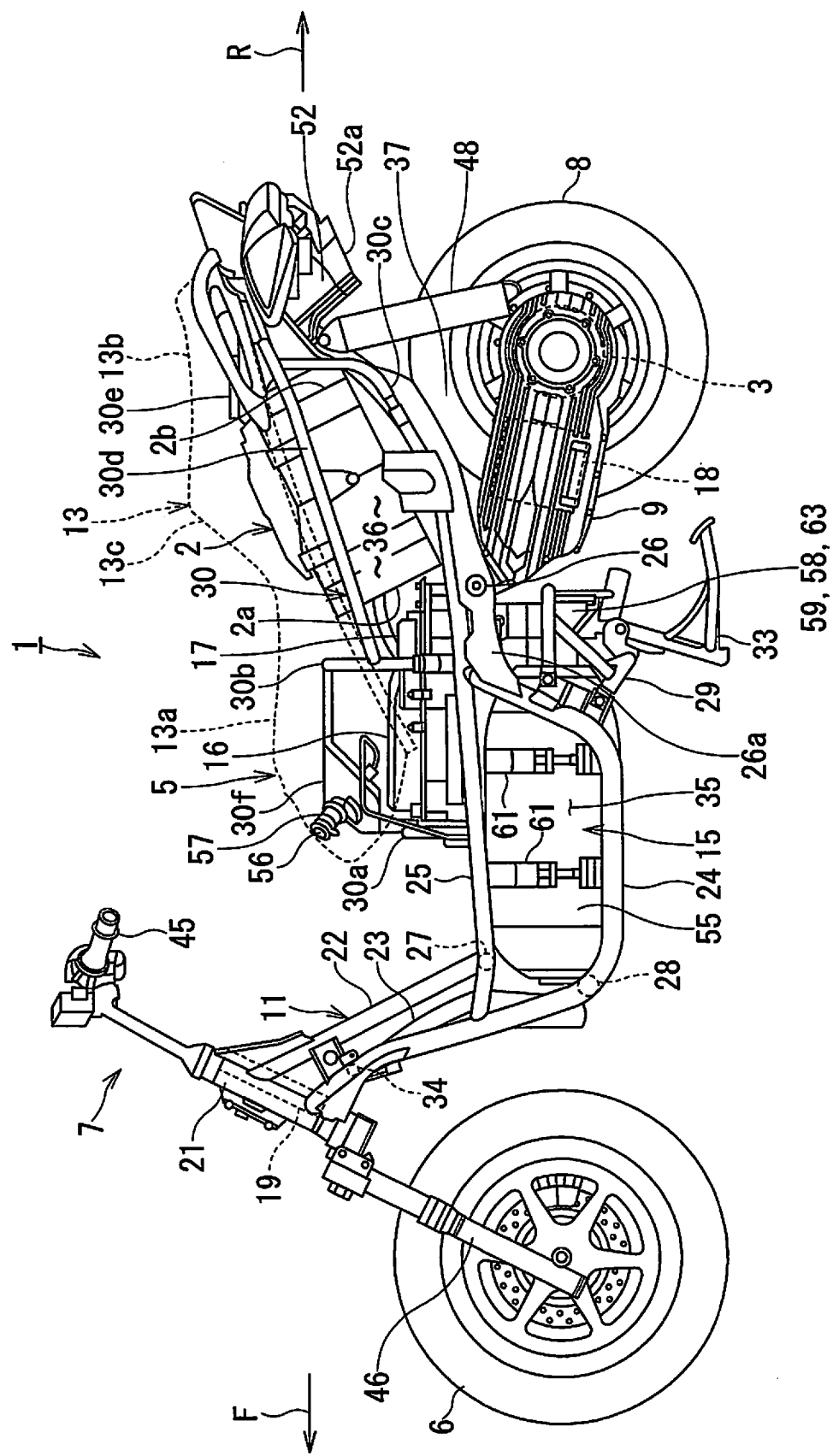
FIG. 2 is a left side view of the electric vehicle according to the embodiment of the present invention, with its exteriors being detached.

FIG. 2 is a left side view of the electric vehicle according to the embodiment of the present invention in a state where exterior components, such as a cover and a seat, being detached.

Figure 3:
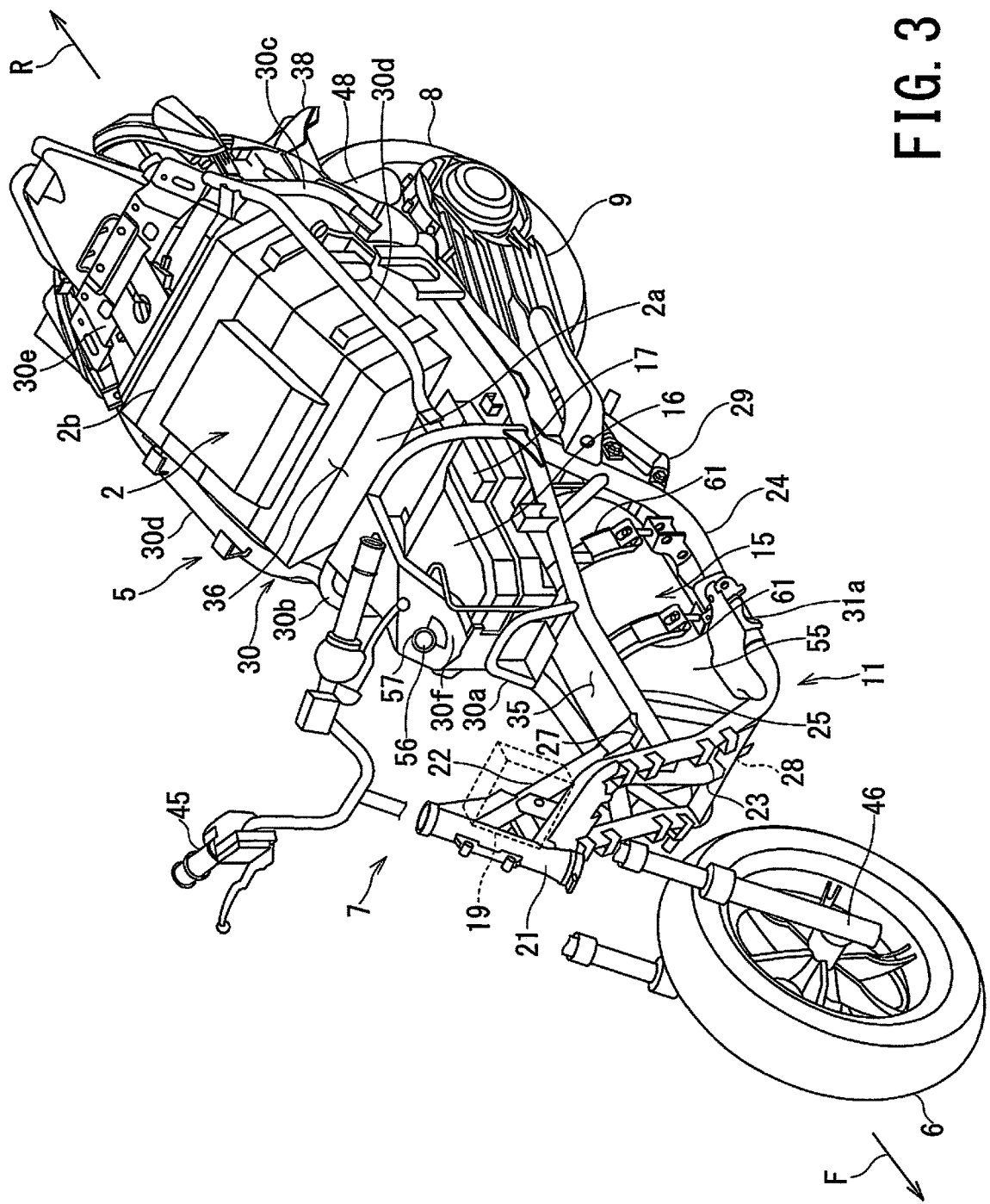
FIG. 3 is a perspective view of the electric vehicle according to the embodiment of the present invention, with its exteriors being detached.

FIG. 3 is a perspective view of the electric vehicle according to the embodiment of the present invention in a state where the exterior components, such as a cover and a seat, being detached.

Note that expressions of front-and-rear, up-and-down, and left-and-right in the present embodiment are based on reference to a rider onboard an electric vehicle 1. In FIGS. 1 to 3, a solid line arrow F represents forward of the electric vehicle 1, and a solid line arrow R represents reward of the electric vehicle 1.

As shown in FIGS. 1 to 3, the electric vehicle 1 according to the present embodiment travels by being driven by an electric motor 3 powered by a fuel cell 2. The electric vehicle 1 is a motorcycle of motor-scooter type, and also a fuel cell powered bicycle traveling by the power of the fuel cell 2. The electric vehicle 1 may also be a tricycle. It may be a type of vehicle that travels by being driven by the electric motor 3 that is powered by a rechargeable battery (not shown) in place of the fuel cell 2.

The electric vehicle 1 includes a vehicle body 5 extending forward and rearward, a front wheel 6 as a steered wheel, a steering mechanism 7 supporting the front wheel 6 in a steerable manner, a rear wheel 8 as a driving wheel, a swing arm 9 supporting the rear wheel 8 so as to be swingable in the up and down direction, and the electric motor 3 which generates driving power of the rear wheel 8.

The vehicle body 5 includes a frame 11 extending forward and rearward of the vehicle, an exterior 12 covering the frame 11, and a seat 13 disposed above a rear half part of the frame 11.

Further, the vehicle body 5 includes a fuel cell 2, a fuel tank 15 configured to store high pressure gas of hydrogen as a fuel to be used for power generation in the fuel cell 2, a rechargeable battery 16 configured to supplement power of the fuel cell 2, a power management apparatus 17 configured to adjust output voltage of the fuel cell 2 and control power distribution between the fuel cell 2 and the rechargeable battery 16, an inverter 18 configured to convert DC power outputted by the power management apparatus 17 into three-phase AC power and outputs it to the electric motor 3 to operate the electric motor 3, and a vehicle controller 19 configured to comprehensively control those mentioned before.

A power train of the electric vehicle 1 includes the fuel cell 2 and the rechargeable battery 16, is a system which appropriately utilizes power of each power supply depending on travelling conditions of the vehicle, power generation conditions of the fuel cell 2, and power storage conditions of the rechargeable battery 16. The electric vehicle 1 generates regenerative power at the electric motor 3 during deceleration. The rechargeable battery 16 and the fuel cell 2, which are power sources of the vehicle, are connected in parallel to the inverter 18 and supply power to the electric motor 3. The rechargeable battery 16 stores regenerative power generated at the electric motor 3 when the electric vehicle 1 decelerates, and power generated by the fuel cell 2.

The frame 11 is made up of a plurality of steel hollow pipes combined into a single body. The frame 11 includes a head pipe 21 disposed above the front end of the frame 11, an upper down-frame 22 extending from a central part of the head pipe 21 in a rearwardly and downwardly inclined manner, a lower down-frame 23 disposed below the head pipe 21 and extending in a rearwardly and downwardly inclined manner, a pair of left and right lower frames 24, a pair of left and right upper frames 25, a pivot shaft 26, an upper bridge frame 27, a lower bridge frame 28, a guard frame 29, and a mounted-instrument protection frame 30.

The head pipe 21 supports the steering mechanism 7 so as to be steerable, that is, to be swingable in the left and right direction of the electric vehicle 1.

The pair of left and right lower frames 24 are disposed in the left and the right of the lower down-frame 23 and connected to a lower part of the head pipe 21. The pair of left and right lower frames 24 each include a front-side inclined portion extending from a connected portion with the head pipe 21 substantially in parallel along the lower down-frame 23 and in a rearwardly and downwardly inclined manner, a front-side curved portion curved rearwardly at a lower end of the front-side inclined portion, and a straight portion extending substantially horizontally from a rear end of the front-side curved portion toward rearward of the vehicle body 5 in a linear manner until reaching a central portion of the vehicle body 5, that is, a central portion in the front and rear direction of the electric vehicle 1. The pair of left and right lower frames 24 each include a rear-side curved portion curved toward rearward and upward from a rear end part of the straight portion, a rear-side inclined portion extending from an upper end part of the rear-side curved portion in a rearwardly and upwardly inclined manner, and an upper and lower frame joining part connecting the rear-side inclined portion to the upper frame 25. A spacing between the left and right lower frames 24 is wider than that between the left and right upper frames 25.

A near-head-pipe bridge frame 34 is constructed between upper parts of the left and right lower frames 24. The near-head-pipe bridge frame 34 extends in a linear manner substantially in the left and right direction of the electric vehicle 1. Each of the left and right lower frames 24 includes a foot rest bracket 31a. The foot rest bracket 31a supports a foot board 31, which is disposed on the outer side of the front-side curved portion, from below. A rider can lay its foot on the foot board 31.

The lower frame 24 being disposed on the left side of the vehicle body 5 includes a side stand bracket (not shown). The side stand bracket (not shown) is provided with a side stand (not shown) configured to make the electric vehicle 1 stand by itself in a leftwardly inclined manner. The side stand swings between an erected position for making the electric vehicle 1 stand by itself, and a retracted position for making it stay along the vehicle body 5 so as not to impede travelling.

The pair of left and right upper frames 25 are connected to a central part in the up-and-down direction of the front-side inclined portion of the lower frame 24 in a front half part of the vehicle body 5. The pair of left and right upper frames 25 each include, horizontal portions extending from a connected portion with the front-side inclined portion of the lower frame 24 toward rearward of the vehicle body 5 in a substantially horizontal manner, and rear end parts being rear ends of the horizontal portions of the pair of left and right upper frames 25, the rear end parts being significantly inclined rearwardly and upwardly in the rear half part of the vehicle body 5 and above the rear wheel 8, the rear end parts curved inwardly in the left and right direction of the vehicle body 5 to come close to each other to an extent of about thickness (width size) of the rear wheel 8.

The pivot shaft 26 is constructed between the left and right upper frames 25 in the rear half part of the vehicle body 5. The pivot shaft 26 is constructed between a pair of left and right brackets 26a. Each of the brackets 26a is located below the upper frame 25 and in the rear of a merging portion (upper and down frame joining part) between the upper frame 25 and the lower frame 24. Each of the brackets 26a is connected to the horizontal portion of the upper frame 25, and to the rear-side inclined portion of the lower frame 24.

The upper bridge frame 27 is constructed between the front end parts of the left and right upper frames 25. The upper bridge frame 27 extends substantially linearly in the left and right direction of the vehicle between the left and right upper frames 25 to interconnect the left and right upper frames 25.

The lower bridge frame 28 is constructed between the front-side curved portions of the left and right lower frames 24. The lower bridge frame 28 extends substantially linearly in the left and right direction of the vehicle between the left and right lower frames 24 to interconnect the left and right lower frames 24.

The guard frame 29 is constructed between the rear-side curved portions of the left and right lower frames 24. The guard frame 29 extends rearwardly and downwardly from a connected portion with the left and right lower frames 24, and extends into a rearwardly declined U-shape so as to enlarge the internal space of the frame 11. The guard frame 29 is provided with a center stand 33 configured to make the electric vehicle 1 stand by itself in an upright state. The center stand 33 swings between an erected position for making the electric vehicle 1 stand by itself, and a retracted position for making it stay along the vehicle body 5 so as not to impede travelling.

The upper down-frame 22 is constructed between the head pipe 21 and the upper bridge frame 27.

The lower down-frame 23 includes an upper end part connected to a central part in the left and right direction of the electric vehicle 1 of a near-head-pipe bridge frame 34 constructed between the left and right lower frames 24, and a lower end part connected to a central part in the left and right direction of the electric vehicle 1 of the lower bridge frame 28.

The mounted-instrument protection frame 30 is provided above the rear half part of the upper frame 25. The mounted-instrument protection frame 30 supports and secures the fuel cell 2 to the electric vehicle 1. A part of the mounted-instrument protection frame 30 can be attached and detached to and from the upper frame 25.

The seat 13 extends forward and rearward covering an upper section of the rear half part of the frame 11. The seat 13 is of a tandem type and includes a front half part 13a on which the rider is to be seated, a rear half part 13b on which a passenger is to be seated, and an inclined part 13c between the front half part 13a and the rear half part 13b.

Here, a space surrounded by the left and right upper frames 25 and the left and right lower frames 24 is referred to as a center tunnel region 35. A space surrounded by the rear half part of the upper frame 25, exterior 12, and the seat 13 as an instrument mounting region 36. A space in the rear of the center tunnel region 35 and below the instrument mounting region 36 as a tire house region 37.

The center tunnel region 35 accommodates the fuel tank 15. In the electric vehicle 1 of a motor-scooter type according to the present embodiment, the center tunnel region 35 is disposed along the front and rear direction of the electric vehicle 1 and between left and right foot boards 31 on which the rider places its foot, and rises higher than the foot board 31 such that the foot resting region of the foot board 31 is divided into left and right sections. In other words, the foot board 31, which serves as the foot resting region, is disposed in the left and right of the center tunnel region 35, and the fuel tank 15 is disposed between the left and right foot boards 31.

The instrument mounting region 36 accommodates the rechargeable battery 16, the power management apparatus 17, and the fuel cell 2 in this order from the front side of the vehicle body 5. The mounted-instrument protection frame 30 protects the front end part, the central part, the rear end part, and a side part ranging from the central part to the rear end part of the instrument mounting region 36.

The mounted-instrument protection frame 30 surrounds the instrument mounting region 36 and protects instruments to be mounted in the instrument mounting region 36. The mounted-instrument protection frame 30 includes a front protection frame 30a disposed in the front end part of the instrument mounting region 36, the front protection frame 30a being constructed between the left and right upper frames 25 in an upwardly convex arch shape, a center protection frame 30b disposed in a central part of the instrument mounting region 36 and in the rear of a merging spot between the upper frame 25 and the lower frame 24, the center protection frame 30b being constructed between the left and right upper frames 25 in an upwardly convex arch shape, a pair of left and right rear protection frames 30c disposed at a rear end part of the instrument mounting region 36, the pair of left and right rear protection frames 30c being connected to a portion where each of the left and right upper frames 25 is curved inwardly, the pair of left and right rear protection frames 30c extending rearward and obliquely upward from the curved portion, a pair of left and right side protection frames 30d extending rearward from each of the left and right of the center protection frame 30b to be connected to the upper end parts of the rear protection frames 30c, the pair of left and right side protection frames 30d reaching the rear end part of the vehicle body 5, a bracket 30e constructed between rear end parts of the left and right side protection frames 30d.

The left and right upper frames 25 are bent at a spot where the lower ends of the front protection frame 30a are joined thereto, increase the spacing therebetween toward the rear of the electric vehicle 1. The left and right upper frames 25 are bent at a spot where the lower ends of the center protection frame 30b are joined thereto, and extend to the rear of the electric vehicle 1. Thus, the center protection frame 30b has a larger width and a larger height than those of the front protection frame 30a. The rear protection frame 30c and the pair of the left and right side protection frames 30d are integrated.

The rear protection frame 30c and the pair of left and right side protection frames 30d are detachably interconnected to the center protection frame 30b and the upper frames 25, thereby supporting the fuel cell 2.

A rear wheel 8 is disposed in the tire house region 37.

Between the instrument mounting region 36 and the tire house region 37, a rear fender 38 as a partition member for dividing respective regions is provided.

The exterior 12 includes, a front leg-shield cover 41 covering a front half part of the vehicle body 5, a front frame cover 42 disposed above the center of the vehicle body 5 and covering an upper section of the upper frame 25 such as the center tunnel region 35, and a frame cover 43 disposed in a rear half part of the vehicle body 5 and covering a lower portion of the seat 13.

The frame cover 43 along with the seat 13 surrounds the instrument mounting region 36. The instrument mounting region 36 is a closed space surrounded by the seat 13, the frame cover 43, and the rear fender 38. The instrument mounting region 36 easily and securely controls flow of air to the fuel cell 2 by means of a vent hole (not shown) provided in an appropriate area of the frame cover 43 or the rear fender 38, and also easily and securely controls flow of air as a cooling wind to an apparatus, which needs to be cooled. The instrument mounting region 36 allows air to enter from, for example, a joint of each cover (such as the front frame cover 42, and a frame cover 43).

The steering mechanism 7 is disposed in a front section of the vehicle body 5 and swings in the left and right direction centering on the head pipe 21 of the frame 11, thereby enabling steering of the front wheel 6. The steering mechanism 7 includes a handle 45 provided in a top part, and a pair of left and right front forks 46 interconnecting the handle 45 and the front wheel 6, and the pair of left and right front forks 46 extending in the up and down direction slightly inclined rearwardly. The left and right front forks 46 have a telescopic structure that can be elastically expanded and contracted. An axle (not shown) for rotatably supporting the front wheel 6 is constructed between lower end parts of the left and right front forks 46. The front fender 47 is disposed above the front wheel 6. The front fender 47 is located between the left and right front forks 46, and secured to the front fork 46.

The front wheel 6 is a driven wheel that is rotatable about the axle constructed between the lower end parts of the left and right front forks 46.

The swing arm 9 swings in the up and down direction about the pivot shaft 26 as a rotational center extending in the left and right direction of the vehicle body 5. The swing arm 9 rotatably supports the rear wheel 8 between a pair of arms extending in the front and rear direction on left and right sides of the vehicle body 5, respectively. A rear suspension 48 is constructed between the frame 11 and the swing arm 9. The upper end part of the rear suspension 48 is swingably supported at the rear end part of the upper frame 25. The lower end part of the rear suspension 48 is swingably attached to the rear end part of the swing arm 9. The rear suspension 48 buffers the swinging of the swing arm 9.

The swing arm 9 accommodates a electric motor 3 rotationally driving the rear wheel 8, and an inverter 18 converting DC power supplied from the fuel cell 2 into AC power to supply it to the electric motor 3.

The electric motor 3 rotationally drives the rear wheel 8 with power supplied from the fuel cell 2 or the rechargeable battery 16, thereby causing the electric vehicle 1 to travel. The electric motor 3 is accommodated in a rear part of the swing arm 9 and coaxially disposed with the axle of the rear wheel 8. The electric motor 3 is integrally assembled to the swing arm 9 to constitute a unit-swing-type swing arm.

The inverter 18 is accommodated in a front part of the swing arm 9, and disposed between the pivot shaft 26 and the electric motor 3. The inverter converts DC power outputted by the power management apparatus 17 into three-phase AC power, and adjusts the rotational speed of the electric motor 3 by altering the frequency of the AC power.

The rear wheel 8 is the driving wheel being supported by the axle (not shown) to which driving force is transferred from the electric motor 3.

The fuel cell 2 generates power by causing reaction between a fuel and an oxidizing agent. The fuel cell 2 is an air-cooled fuel cell system generating power by using a high pressure gas, for example, hydrogen gas as the fuel, and oxygen in the air as the oxidizing agent, and is cooled by using air.

The fuel cell 2 is disposed on the rear half side of the instrument mounting region 36. The fuel cell 2 is disposed below the seat 13 over a range from an inclined part between the front half part 13*a* and rear half part 13*b* to the rear half part 13*b*. That is, in the side view of the vehicle, the fuel cell 2 is disposed between the rear half part 13*b* of the seat 13, on which the passenger is to be seated, and the rear wheel 8 and the swing arm 9.

The fuel cell 2 has a cuboidal shape having a long side extending in the front and rear direction of the vehicle body 5, and is disposed in the instrument mounting region 36 in a posture in which its front face, in which the intake port 2*a* is disposed, faces forward and obliquely downward, and its back face, in which the exhaust port 2*b* is disposed, faces rearward and obliquely upward. That is, the fuel cell 2 is secured to the frame 11 in a forward leaning posture in which its front side is located lower than its rear side. The upper part of the fuel cell 2 is secured to a mounted instrument protection frame 30 and the lower part of the fuel cell 2 is secured to the upper frame 25.

The fuel cell 2 includes a plurality of flat modules interconnected from the front side toward the rear side. The fuel cell 2 includes a filter (not shown), an intake shutter (not shown), a fuel cell stack (not shown), a fan (not shown), and an exhaust shutter (not shown), which are interconnected by being superposed on each other in a laminated state in order from the front side. A fuel cell control unit (not shown) is provided on the top face of the fuel cell 2.

The intake shutter includes an openable/closable intake port 2*a* of air, and configured to control the amount of air introduced to the fuel cell stack by opening/closing the intake port 2*a*. The intake shutter configured to constitute a circulation path for circulating air in the fuel cell 2 by closing the intake port 2*a*. The exhaust shutter includes an openable/closable exhaust port 2*b* of air and configured to constitute the circulation path for circulating air in the fuel cell 2 by closing the exhaust port 2*b*. In other words, the fuel cell 2 includes the openable/closable intake port 2*a* in the front face, and the openable/closable exhaust port 2*b* in the back face, and configured to cause air to be circulated in the fuel cell 2 by closing the intake port 2*a* and the exhaust port 2*b*.

The fuel cell stack causes electrochemical reaction between oxygen contained in the air drawn through the intake port and hydrogen supplied from the fuel tank 15 to generate power, and produces a wet excess gas after generation.

The fan generates intake negative pressure for drawing air in the instrument mounting region 36 from the intake port into the fuel cell 2, while drawing out the excess gas from the fuel cell stack and discharges it from the exhaust port. The flow of air being caused by the fan is used for the power generation in the fuel cell stack, as well as for the cooling of the fuel cell 2.

An exhaust duct 52 is provided in the rear of the fuel cell 2. The fan of the fuel cell 2 draws out excess gas from the fuel cell stack and discharges it to the exhaust duct 52. The front end part of the exhaust duct 52 is airtightly connected to a box, which is a frame body of the exhaust shutter, of the fuel cell 2. The exhaust duct 52 includes an exhaust port 52*a* opened toward rearwardly downward, and rearwardly upward at the rear end of the vehicle body 5. The exhaust duct 52 guides exhaust gas (excess gas) ejected from the fan of the fuel cell 2 to the exhaust port 52*a* and discharges it to the rear of the vehicle body 5.

The exhaust port 52*a* is disposed higher than the exhaust face (back face), and preferably at the upper end part of the rear section of the exhaust duct 52. In other words, the upper edge part of the exhaust port 52*a* is disposed at a position higher than the exhaust port of the fuel cell 2. As a result of having the exhaust port 52*a* disposed to be higher than the exhaust face (back face) of the fuel cell 2, the exhaust duct 52 guides a wet excess gas containing unreacted hydrogen gas to the exhaust port 52*a* and securely discharge it from the vehicle body 5.

The fuel tank 15 is a high-pressure compressed hydrogen storage system. The fuel tank 15 includes a pressure vessel 55 made of carbon fiber reinforced plastic (CFRP), or being a composite vessel made from an aluminum liner, a fuel filling joint 57 having a fuel filling port 56, a fuel filling main valve 58, a fuel supply main valve 59 integrally including a shut-off valve (not shown) and a regulator (not shown), and a secondary pressure reducing valve (not shown).

The pressure vessel 55 is a composite vessel made from an aluminum liner which stores hydrogen gas as fuel of the fuel cell 2. The fuel tank 15 stores, for example, hydrogen gas of about 70 megapascal (MPa.) The pressure vessel 55 includes a cylinder-shaped barrel part, and a dome-shaped mirror plate provided on front and rear end faces of the barrel part. The pressure vessel 55 is disposed in the center tunnel region 35 with the central axis of the cylindrical barrel being aligned along the front and rear direction of the vehicle body 5. The pressure vessel 55 is surrounded by a pair of upper frames 25, a pair of lower frames 24, a lower bridge frame 28, and a guard frame 29, and is robustly protected against load due to turning over or collision of the electric vehicle 1.

The pressure vessel 55 is supported in the center tunnel region 35 by a clamp band 61 constructed between an upper frame 25 disposed at one side of the vehicle body 5, for example, the upper frame 25 disposed at the right side of the vehicle body 5, and a lower frame 24 disposed at another side of the vehicle body, for example, the lower frame 24 disposed at the left side of the vehicle body 5. The pressure vessel 55 is placed on a lower clamp band, for example, a lower half part of the clamp band 61 being constructed between the right side upper frame 25 and an left side lower frame 24, and is clamped by the upper clamp band, for example, an upper half part of the clamp band 61 to be sandwiched. Note that the clamp band 61 may be constructed between the upper frame 25 disposed at the left side of the vehicle body 5 and the lower frame 24 disposed at the right side of the vehicle body 5.

The fuel filling joint 57 is disposed outside of the center tunnel region 35, more specifically, rearwardly upward of the center tunnel region 35, and at the front end part of the instrument mounting region 36. The fuel filling joint 57 is disposed to be higher than or just above the rechargeable battery 16. The fuel filling joint 57 is secured to the joint bracket 30f being constructed between the upper parts of the front protection frame 30a and the center protection frame 30b of the mounted-instrument protection frame 30. The fuel filling joint 57 extends toward upward, and slightly leftward of the vehicle body 5 such that a facility side joint can be inserted from the upper side and left side of the vehicle body at the time of fuel filling. The fuel filling joint 57 is covered and hidden by the fuel filling port lid 62 being disposed at the front end of the seat 13. The fuel filling port lid 62 is supported to the seat 13 via a hinge mechanism (not shown), and opens/closes by being swung. The fuel filling joint 57 has a fuel filling port 56 as an inlet for introducing high pressure gas of hydrogen as a fuel into the fuel tank 15.

The fuel filling port 56 is disposed at a top part of the fuel filling joint 57. The fuel filling port 56 is oriented toward the upper left of the vehicle body 5. In filling the fuel tank 15 with fuel, the upward of the fuel filling port 56 is opened to the atmosphere in a state in which the fuel filling port lid 62 is opened. Thus, in charging high pressure gas, for example, hydrogen gas as fuel, into the fuel tank 15, even if the high pressure gas leaks, the leaked fuel diffuses toward the upward of the electric vehicle 1 without residing therein.

A fuel filling main valve 58 and a fuel supply main valve 59 are integrated and incorporated in a tank valve 63 provided on the top part of the rear-side mirror plate of the pressure vessel 55. The tank valve 63 is disposed in a space surrounded by the guard frame 29. The fuel supply main valve 59 includes a shut-off valve (not shown) and a primary pressure reducing valve (not shown). The fuel filling main valve 58 and the shut-off valve of the fuel supply main valve 59 are an on-off valve using an electromagnetic valve. The primary pressure reducing valve and the secondary pressure reducing valve of the fuel supply main valve 59 successively reduce and thereby adjust the pressure of the high pressure fuel gas from the pressure vessel 55.

The rechargeable battery 16 is a box-shaped lithium ion battery. The rechargeable battery 16 is disposed in the front end part of the instrument mounting region 36 and between the rear half part of the pressure vessel 55, that is, the rear half part of the cylindrical barrel and the rear-side mirror plate, and the front half part 13a of the seat 13.

Note that, the electric vehicle 1 includes, besides the rechargeable battery 16, a second rechargeable battery (not shown) supplying, for example, 12V-based power as a power supply for meters (not shown) and lights (not shown). The second rechargeable battery is disposed around the head pipe 21, for example, beside the right side of the head pipe 21.

In the electric vehicle 1, even if hydrogen gas as fuel leaks from the fuel filling port 56, the hydrogen gas, which is lighter than air, moves up, thus diffusing to the outside of the electric vehicle 1 without residing within the electric vehicle 1. Even if hydrogen gas as fuel leaks from the fuel filling main valve 58 or the fuel supply main valve 59, the hydrogen gas moves toward the tire house region 37, thus diffusing to the outside of the electric vehicle 1 without residing within the electric vehicle 1.

The power management apparatus 17 is disposed between the rechargeable battery 16 and the fuel cell 2 in the instrument mounting region 36, and is secured to the frame 11. Note that the power management apparatus 17 may be disposed along with the rechargeable battery 16 in a same waterproof case.

By disposing the rechargeable battery 16, the power management apparatus 17, and the fuel cell 2 in a manner as described above, it becomes possible to dispose apparatuses adjoining to each other in the electrical connection to be closer to each other as much as possible, thus shortening the wiring length between the apparatuses, and reducing the weight relating to the wiring.

The vehicle controller 19 is disposed around the head pipe 21 being a relatively high place in the electric vehicle 1, for example, beside the left side of the head pipe 21 corresponding to the opposite side of the second rechargeable battery, which supplies 12V-based power.

Next, an exterior structure of the electric vehicle 1 will be described in detail.

Figure 4:
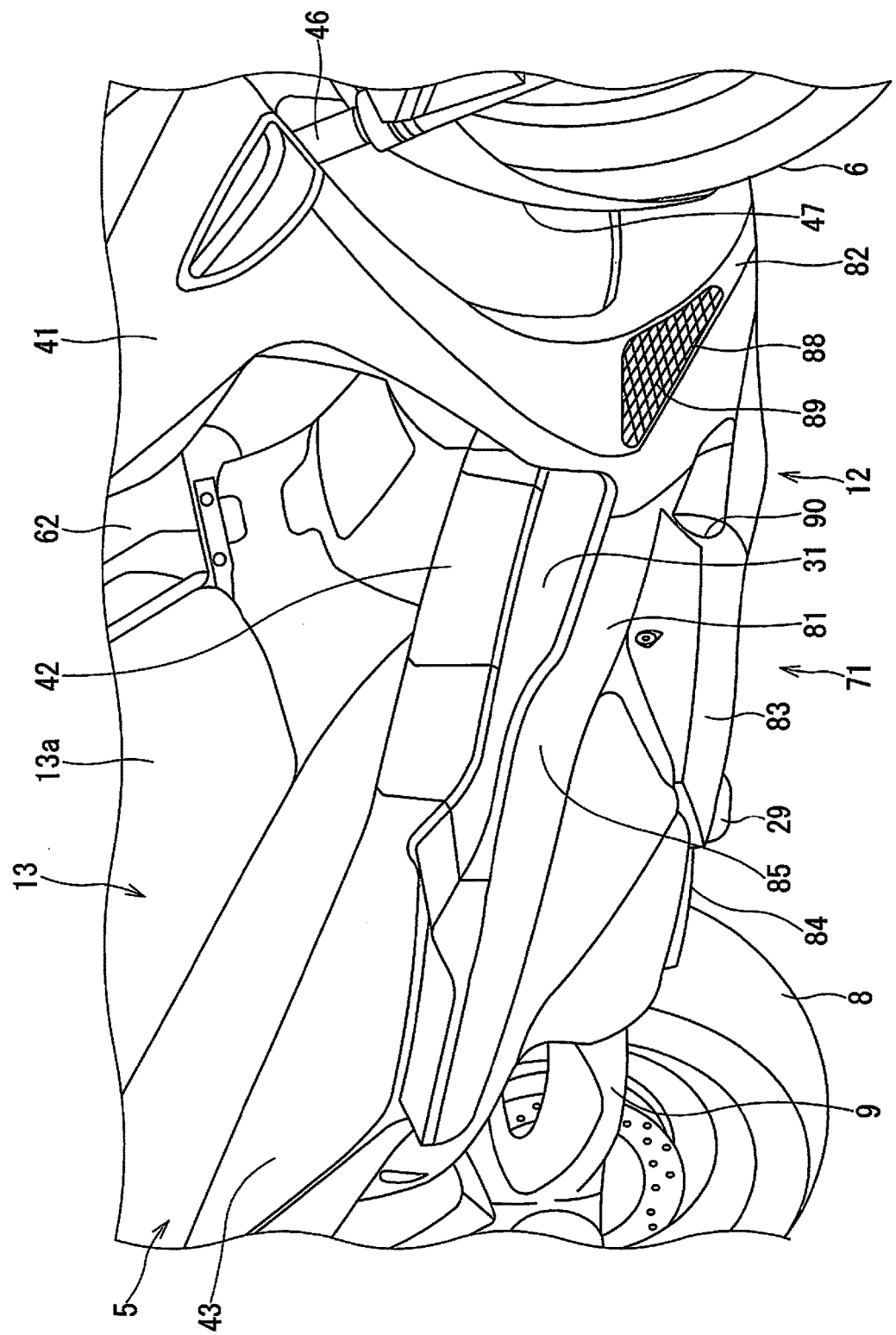
FIG. 4 is a perspective view of an exterior structure of the electric vehicle according to the embodiment of the present invention.
Figure 5:
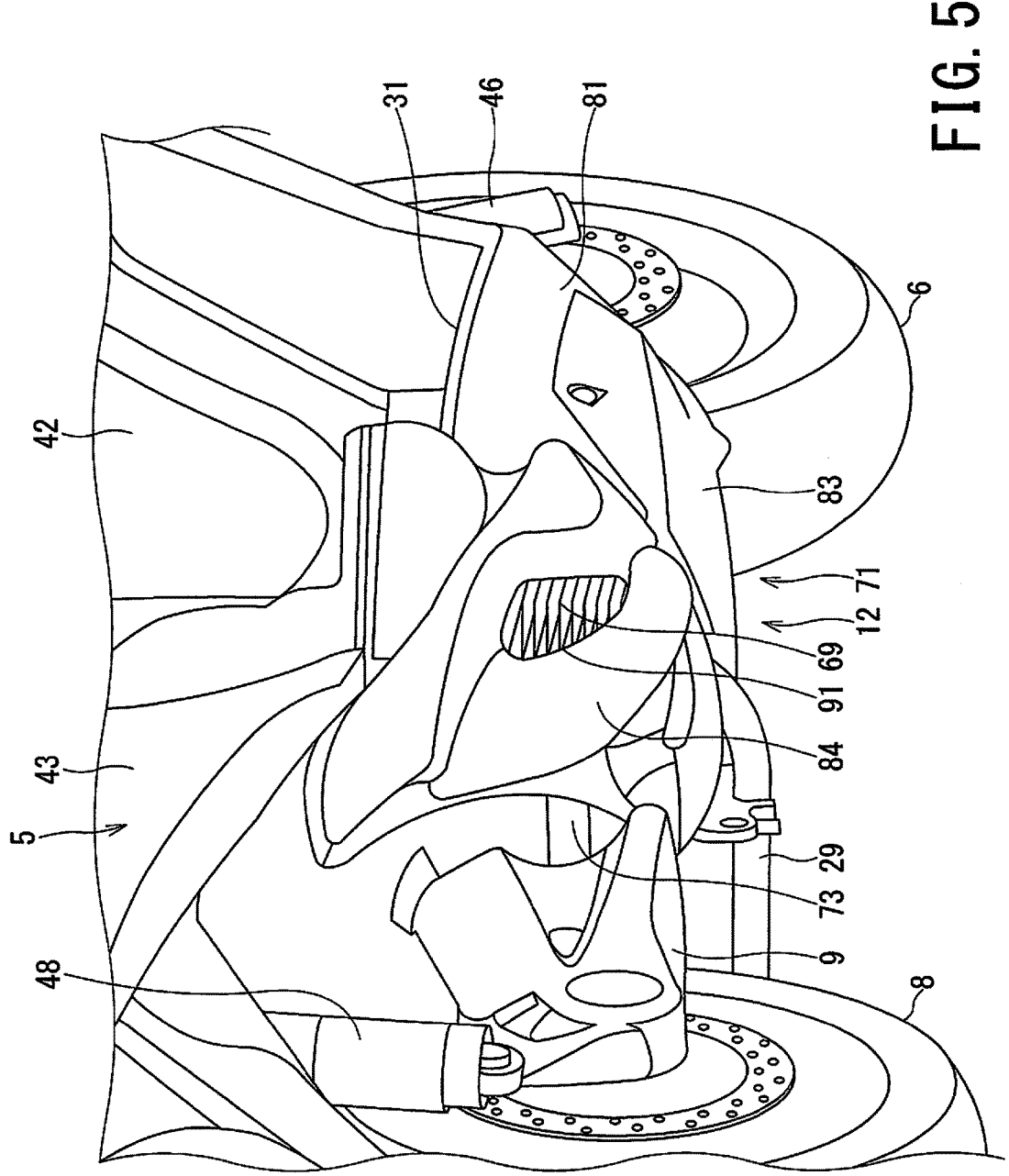
FIG. 5 is a perspective view of the exterior structure of the electric vehicle according to the embodiment of the present invention.

FIGS. 4 and 5 each are a perspective view of the exterior structure of the electric vehicle according to the embodiment of the present invention.

Figure 6:
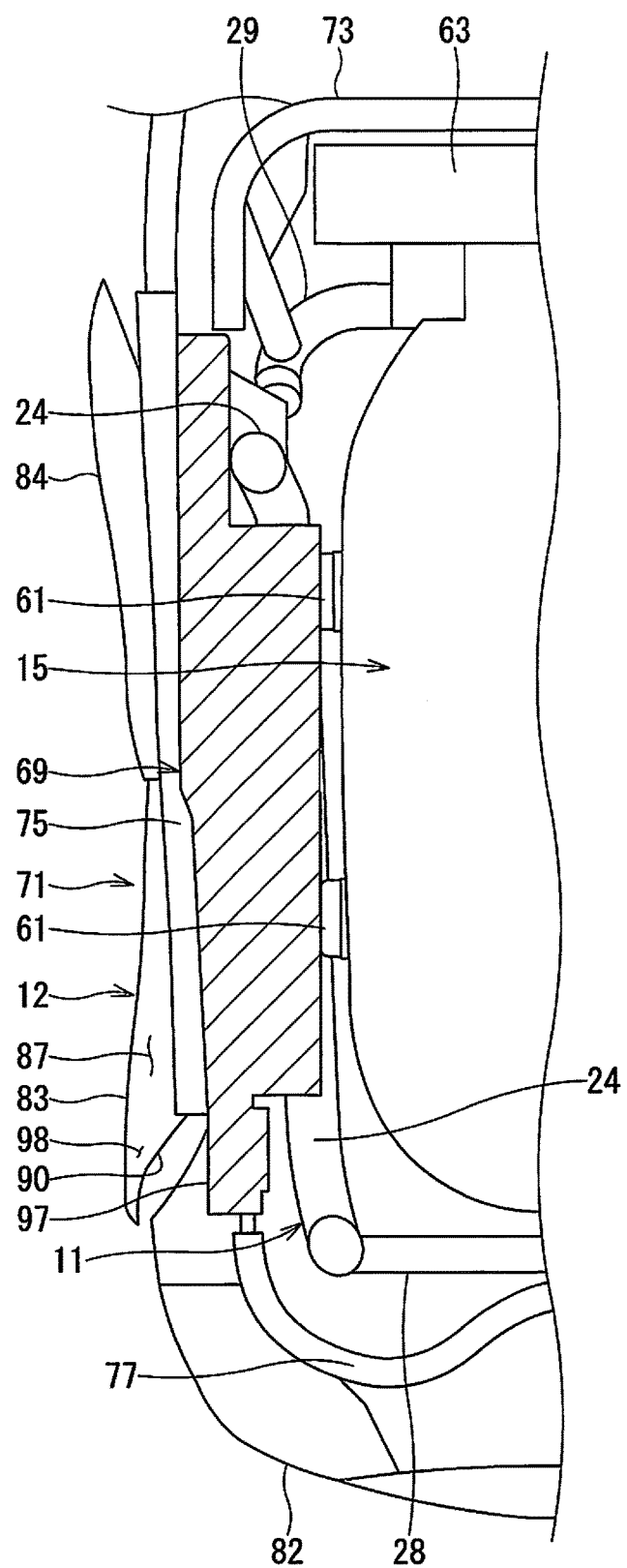
FIG. 6 is a plan view of the exterior structure of the electric vehicle according to the embodiment of the present invention.

FIG. 6 is a plan view of the exterior structure of the electric vehicle according to the embodiment of the present invention.

Figure 7:
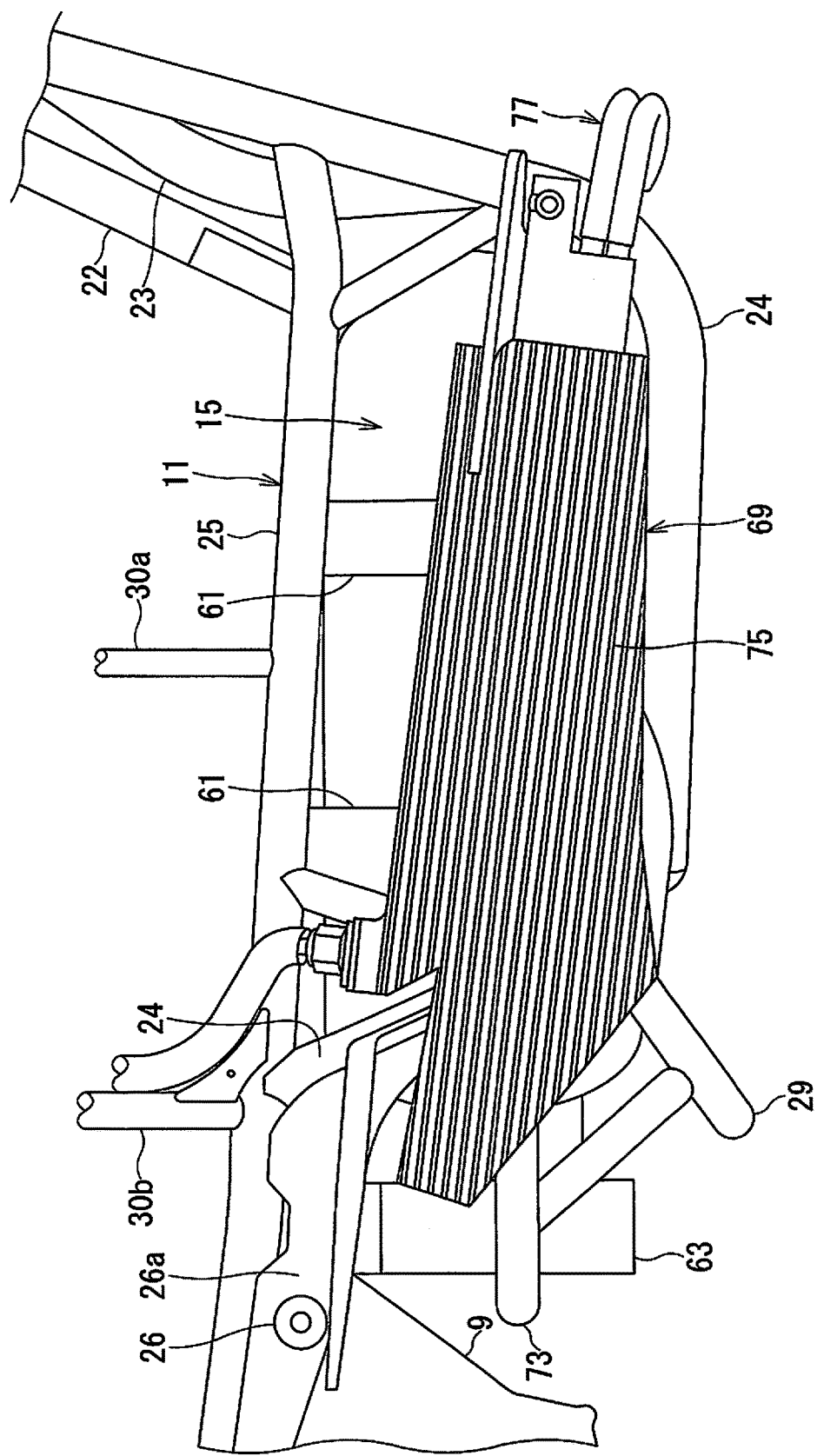
FIG. 7 is a right side view of the exterior structure of the electric vehicle according to the embodiment of the present invention.

FIG. 7 is a right side view of the exterior structure of the electric vehicle according to the embodiment of the present invention.

FIG. 7 illustrates a state where the exterior 12 is detached.

As shown in FIGS. 4 to 7, an exterior structure 71 of the electric vehicle 1 according to the present embodiment includes the frame 11 extending in the longitudinal direction, a power converter 69 being long in the longitudinal direction along the frame 11, the exterior 12 extending in the longitudinal direction to cover the frame 11 and the power converter 69.

The power converter 69 is a DC-DC converter, for example. The power converter 69 has an input connected to the fuel cell 2 and the rechargeable battery 16. The power converter 69 has an output connected to electric components such as meters (not illustrated) and lamps (not illustrated), and the second rechargeable battery. The power converter 69 converts direct-current power supplied from the fuel cell 2 and the rechargeable battery 16 into direct-current power of high voltage (e.g. 48 volt system) to be supplied to the electric motor 3 or direct-current power of 12 volt system to be supplied to the electric components other than the electric motor 3 to output the direct-current power.

The power converter 69 is disposed on any one of sides of the fuel tank 15, for example, on a right side thereof. The power converter 69 has a length similar to that of the pressure vessel 55 of the fuel tank 15, and extends in the longitudinal direction of the vehicle body 5 with its front and rear ends being substantially aligned with respective front and rear ends of the pressure vessel 55. The front end of the power converter 69 is disposed behind the lower bridge frame 28 of the frame 11. The rear end of the power converter 69 is disposed ahead a rear end of a valve protection frame 73. The valve protection frame 73 is provided between inclined portions on a rear side of the right and left lower frames 24 to surround the fuel filling main valve 58 and the fuel supply main valve 59 (tank valve 63) of the fuel tank 15. The front end of the power converter 69 is fixed to the front-side inclined portion of the lower frames 24 with fasteners, for example, bolts (not illustrated). The rear end of the power converter 69 is fixed to the rear-side inclined portion of the lower frames 24 with fasteners, for example, bolts (not illustrated). The power converter 69 allows its front and rear ends to be fixed to the lower frames 24 to transmit its heat the lower frames 24, thereby enabling heat dissipation, as well as to couple the front-side inclined portion and the rear-side inclined portion of the lower frame 24 to each other for reinforcement.

The power converter 69 includes a case in the shape of an elongated rectangular parallelepiped. The power converter 69 is disposed at a position above the lowermost portion of lower frame 24. The power converter 69 has a left side face entering a space between the right upper frame 25 and the right lower frame 24 in the frame 11, that is, the center tunnel region 35. The left side face of the power converter 69 faces the pressure vessel 55. The power converter 69 has a right side face facing an inner surface of the exterior 12. The power converter 69 has a top face facing the right upper frame 25. The power converter 69 has a bottom face facing the right lower frame 24.

The right side face of the power converter 69, that is, the face facing the exterior 12 includes a plurality of heat radiation fins 75. The heat radiation fins 75 arrange vertically and extend in the longitudinal direction. The heat radiation fins 75 also extend backward along the foot board 31 of the exterior 12 at a slightly upward angle.

An electric power line 77 connected to the power converter 69, that is, the electric power line 77 connecting the power converter 69 and the rechargeable battery 16 to each other is wired from the front end of the power converter 69 while detouring in front of the lower bridge frame 28 at the right side to the power converter 69. An electric power line (not illustrated) connecting the power converter 69 and the fuel cell 2 to each other is attached to the rear end of the power converter 69. The electric power line connecting the power converter 69 and the fuel cell 2 to each other is wired upward.

The exterior 12 includes the foot board 31, a foot board lower cover 81 provided below the foot board 31, a lower leg shield cover 82 with which a front face of the power converter 69 is covered, an undercover 83 connected to a lower end of the lower leg shield cover 82 to cover the power converter 69 together with a bottom portion of the frame 11, and a rear lower fender cover 84 provided behind the undercover 83 to cover the power converter 69.

The foot board 31 is connected to a lower end of each of the front frame cover 42 and the frame cover 43, and has appropriate height and width allowing a rider and a fellow passenger to place their feet thereon.

The foot board lower cover 81 extends back and forth along an outer edge portion of the foot board 31.

The lower leg shield cover 82 is connected to a lower end of the front leg shield cover 41 to cover a lower end of a front face of the vehicle body 5. The lower leg shield cover 82 extends in a U-shape, as viewed from the front of the vehicle body 5, to cover the lower frame 24 and the lower bridge frame 28 of the frame 11.

The undercover 83 cover the fuel tank 15, the right and left lower frames 24, and the power converter 69 from below.

The rear lower fender cover 84 is provided below the frame cover 43 to constitute a right and left pair of rear lower fender covers 84, and is disposed at a front end of the tire housing region 37 to cover a front end of the swing arm 9 supported by the pivot shaft 26 from the left and right sides to protect the front end of the swing arm 9.

The exterior 12 is provided with a recessed portion 85 below the seat 13, in particular substantially immediately below a front end of the seat 13. The recessed portion 85 is provided in a part of the exterior 12, for example, in the foot board 31 and the foot board lower cover 81, and recessed toward a central side of the vehicle body 5. The recessed portion 85 improves foot-grounding capability when a rider stops the vehicle or rides it.

The power converter 69 may be disposed on a left side of the fuel tank 15. In this case, a right and left relationship among the frame 11, the exterior 12, and the power converter 69 is reversed.

Figure 8:
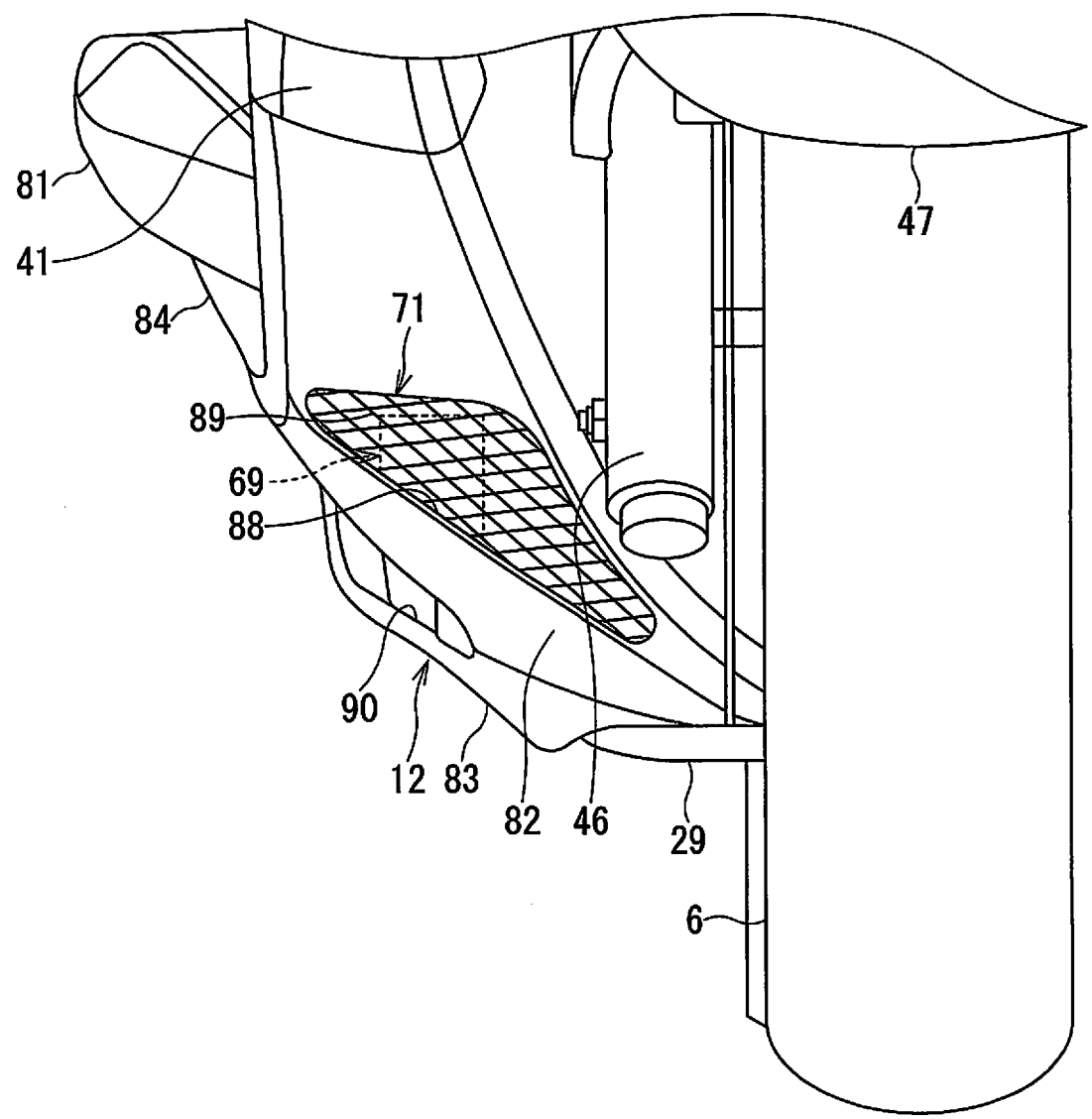
FIG. 8 is a front view of the exterior structure of the electric vehicle according to the embodiment of the present invention.

FIG. 8 is a front view of the cooling structure of the power converter of the electric vehicle according to the embodiment of the present invention.

Figure 9:
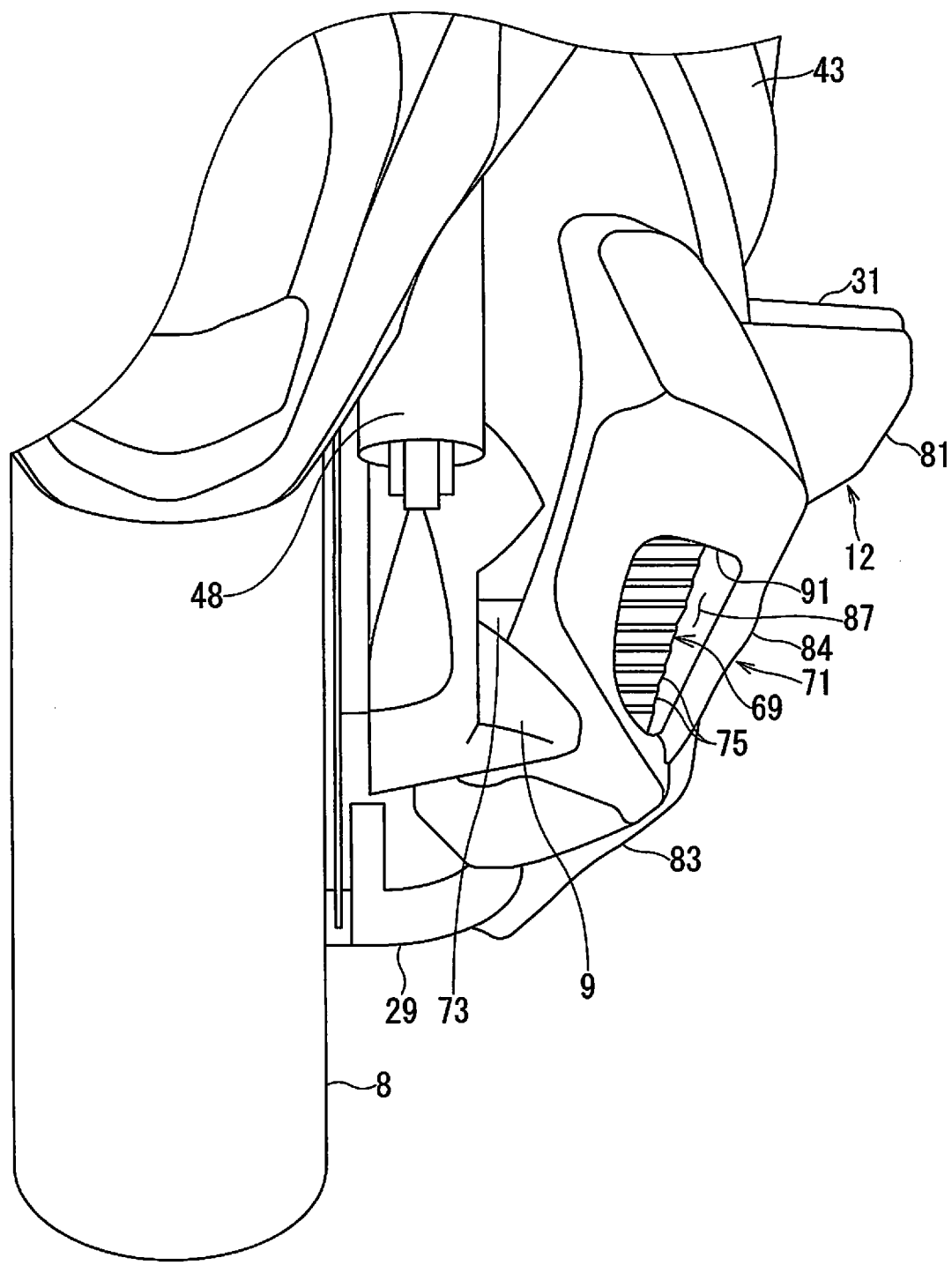
FIG. 9 is a rear view of the exterior structure of the electric vehicle according to the embodiment of the present invention.

FIG. 9 is a rear view of the cooling structure of the power converter of the electric vehicle according to the embodiment of the present invention.

Figure 10:
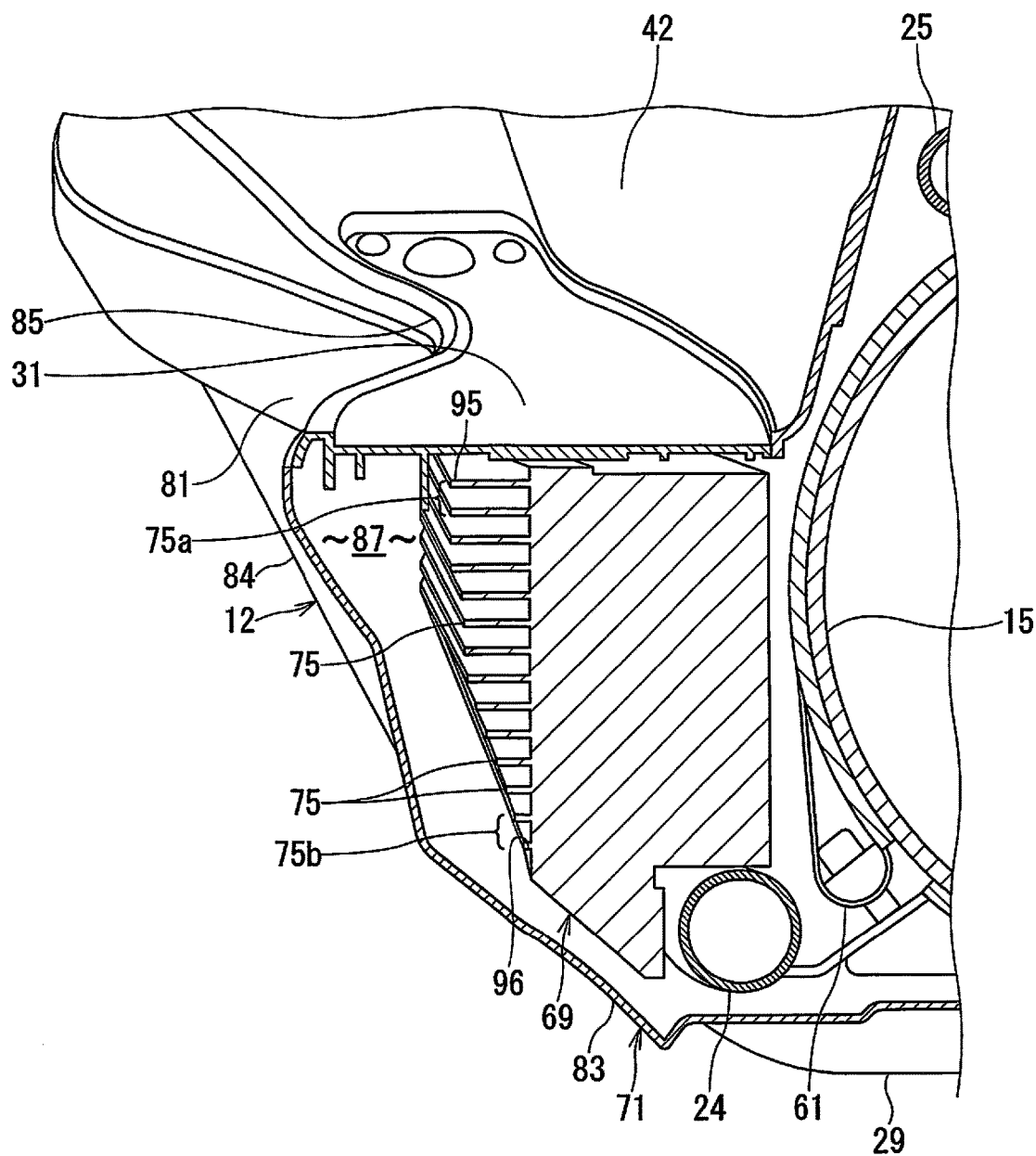
FIG. 10 is a sectional view of the exterior structure of the electric vehicle according to the embodiment of the present invention.
Figure 11:
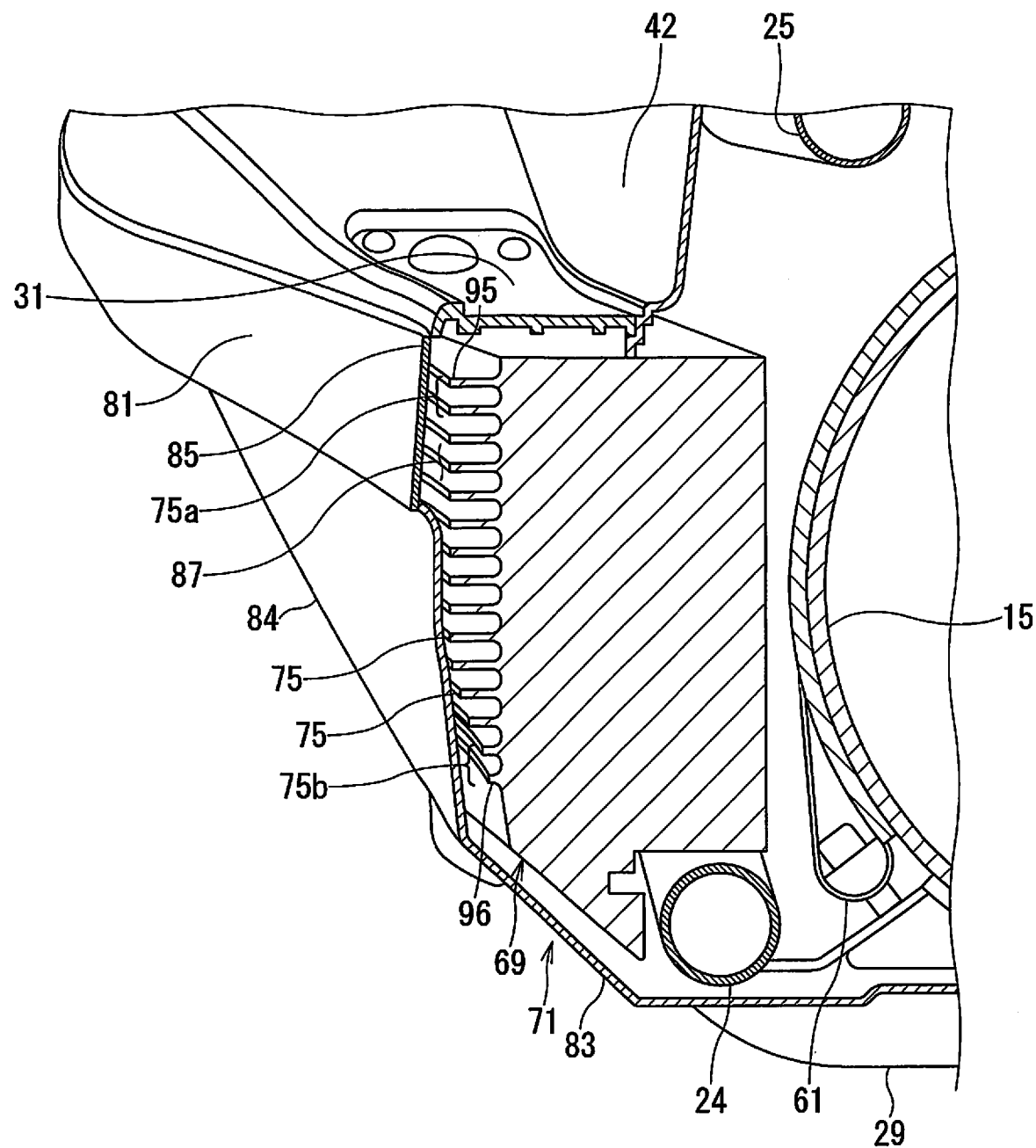
FIG. 11 is a sectional view of the exterior structure of the electric vehicle according to the embodiment of the present invention.

FIGS. 10 and 11 each are a sectional view of the cooling structure of the power converter of the electric vehicle according to the embodiment of the present invention.

FIG. 11 is a sectional view taken along the recessed portion 85, and FIG. 10 is a sectional view taken along a general portion other than the recessed portion 85.

As shown in FIGS. 8 to 11, the exterior 12 of the exterior structure 71 according to the present embodiment extends in the longitudinal direction of the electric vehicle 1 to cover the frame 11 and the power converter 69, and defines a cooling air path 87 for the power converter 69 to allow cooling air to flow through the cooling air path 87. The cooling air path 87 extends along the longitudinal direction.

The cooling air path 87 is a space defined by the inner surface of the exterior 12, that is, by an inner surface of each of the lower leg shield cover 82, the undercover 83, and an inner surface of the rear lower fender cover 84, and a right side face of the power converter 69. The cooling air path 87 extends in the longitudinal direction of the vehicle body 5 in the shape of a duct. The cooling air path 87 is defined by the exterior 12 expanding toward the outside of the vehicle body 5 with respect to the right side face of the planar power converter 69, which is not limited. The cooling air path 87 may be defined by a combination of the power converter 69 having a right side face recessed toward a central side of the vehicle body 5 or a fuel tank 15 side, and a flat exterior 12.

The exterior 12 includes an air induction port 88 provided at a front end of the cooling air path 87 to allow travelling wind to flow into the cooling air path 87. The air induction port 88 is provided in the lower leg shield cover 82, and is disposed in front of the power converter 69. The air induction port 88 is disposed at a side of the front wheel 6 as viewed from the front of the electric vehicle 1, and is opened toward the front of the electric vehicle 1. The air induction port 88 is a triangular opening, as viewed from the front of the vehicle, extending toward a central side of the electric vehicle 1 so as to avoid the front fork 46. The air induction port 88 includes a mesh filter 89. The mesh filter 89 prevents a foreign matter such as a leaf from entering the cooling air path 87. Behind the air induction port 88, the front end of the power converter 69 extends toward the air induction port 88 and is disposed close to the air induction port 88. The front end of the power converter 69 guides travelling wind flowing through the air induction port 88 to the cooling air path 87, which is a space between the exterior 12 and the power converter 69. The electric power line 77 is connected to the front end of the power converter 69.

A right side face in a front end portion of the power converter 69 includes no heat radiation fin 75, and serves as an air induction plate 97 guiding travelling wind into the cooling air path 87. A cooling air guiding space 98 larger than the cooling air path 87 is disposed on a right side of the front end portion of the power converter 69, that is, between the exterior 12 and the power converter 69. The exterior 12 positioned outside the cooling air guiding space 98 is provided with a second air induction port 90 facing toward the front of the electric vehicle 1. The second air induction port 90 is provided outside and below the air induction port 88 as viewed from the front of the electric vehicle 1, and is positioned behind the air induction port 88. The second air induction port 90 receives travelling wind flowing rearward from the periphery of the air induction port 88 to allow the travelling wind to be efficiently fed to the cooling air guiding space. The travelling wind captured through the second air induction port 90 is guided to the right side face in the front end portion of the power converter 69 together with travelling wind captured through the air induction port 88 to be efficiently fed into the cooling air path 87, thereby cooling the power converter 69. Even the second air induction port 90 is provided in the exterior 12 in front of the heat radiation fins 75 in the longitudinal direction of the electric vehicle 1, it can be provided opposite to the heat radiation fins 75 to allow the travelling wind to be directly fed into the cooling air path 87. The second air induction port 90 enables cooling performance to be improved by allowing powerful travelling wind to be directly fed into the cooling air path 87 to increase an air flow of cooling air flowing through the cooling air path 87.

The exterior 12 includes an air exhaust port 91 provided at a rear end of the cooling air path 87 and facing the rear of the electric vehicle 1 to allow air to flow out from the cooling air path 87. The air exhaust port 91 is provided in the rear lower fender cover 84. The air exhaust port 91 is disposed behind the power converter 69. The air exhaust port 91 is disposed at a side of the rear wheel 8 as viewed from the rear of the electric vehicle 1, and is opened toward the back or rear of the electric vehicle 1 to allow air in the cooling air path 87 to be discharged by using a flow of air passing through the side of the electric vehicle 1, that is, air flowing through the outside of the exterior 12, as the electric vehicle 1 travels. The air exhaust port 91 avoids the swing arm 9 as viewed from the rear of the electric vehicle 1. The heat radiation fins 75 are disposed in the air exhaust port 91 as viewed from the rear of the electric vehicle 1.

The power converter 69 extends in the longitudinal direction in the cooling air path 87. The power converter 69 includes the heat radiation fins 75 protruding toward the inner surface of the exterior 12. The heat radiation fins 75 may be molded integrally with the case of the power converter 69, or may be formed by thermally connecting a separated component to the case.

Some of the heat radiation fins 75, which are heat radiation fins 75a, are closer to the inner surface of the exterior 12 than heat radiation fins 75b at other portions. The heat radiation fins 75a include a heat radiation fin 95 disposed at an uppermost portion, and a heat radiation fin 96 disposed at a lowermost portion.

That is, such the heat radiation fins 75a are closer to the inner surface of the exterior 12 than the heat radiation fins 75b at other portions, and the heat radiation fins 75b at the other portions are farther from the inner surface of the exterior 12 than the heat radiation fins 75a and have a larger gap. This gap between the heat radiation fins 75b at the other portions and the exterior 12 is a part of the cooling air path 87 to serve as a duct guiding air to the heat radiation fins 75. The heat radiation fins 75a are closer to the inner surface of the exterior 12 than the heat radiation fins 75b at other portions, and preferably are close to the extent of not being brought into contact with the inner surface to prevent travelling wind from leaking to the outside of the cooling air path 87 through the gap between the exterior 12 and the heat radiation fins 75. An aspect of allowing the heat radiation fins 75a at same portions and the inner surface of the exterior 12 to close to each other may be achieved by allowing the heat radiation fins 75a to protrude more than the heat radiation fins 75b at those portions, or by allowing the heat radiation fins 75 to uniformly protrude while the exterior 12 is expanded to allow only the heat radiation fins 75a at same portions to be close to the exterior 12, and an aspect of a combination of both aspects above is also available.

The foot board 31 of the exterior 12 is disposed closely to a top face of the power converter 69. This reduces the gap between the exterior 12 and the power converter 69 to further prevent travelling wind from leaking.

The recessed portion 85 of the exterior 12 partially reduces a cross-sectional area of the cooling air path 87. The protruding length of each of the heat radiation fins 75 is reduced along the recessed portion 85. The recessed portion 85 allows the exterior 12 to be close to a leading end of each of the heat radiation fins 75 to partially reduce a cross-sectional area of the cooling air path, thereby increasing air velocity at the recessed portion to accelerate heat exchange at the heat radiation fins 75, and thus cooling performance of the power converter 69 is improved. The recessed portion 85 may extend to a side closer to the power converter 69 than a virtual line connecting leading ends of the heat radiation fins 75 at the front and rear of the recessed portion 85. In such manner, the heat radiation fins 75 allow air flowing through the cooling air path 87 to be urged to flow into a region where the protruding length of the heat radiation fins 75 are reduced, thereby improving the cooling performance. That is, the recessed portion 85 of the exterior 12 simultaneously improves foot-grounding capability of a rider in a case where the electric vehicle 1 is stopped, and the cooling performance of the power converter 69. A circuit generating large heat in the power converter 69 is disposed near the recessed portion 85, the circuit also can be efficiently cooled.

The electric vehicle 1 according to the present embodiment includes the plurality of heat radiation fins 75 protruding toward the inner surface of the exterior 12, in the cooling air path 87, and the air induction port 88 being provided in the exterior 12 to guide travelling wind into the cooling air path 87, and thus the power converter 69 is efficiently cooled by guiding the travelling wind to the heat radiation fins 75 and allowing travelling wind to smoothly flow along the heat radiation fins 75.

Further, the electric vehicle 1 according to the present embodiment enables the exterior 12 and the power converter 69 to define the cooling air path 87 in the shape of a duct, and thus no extra component is needed to cool the power converter 69, and cooling efficiency of the power converter 69 is improved while the number of components being reduced.

Further, the electric vehicle 1 according to the present embodiment includes the air induction port 88 being disposed at a side of the front wheel 6 as viewed from the front of the vehicle, the air induction port 88 being faced the front of the electric vehicle 1, and thus the cooling efficiency of the power converter 69 is improved by allowing the air induction port 88 to efficiently guide travelling wind, flowing through the periphery of the front wheel 6, into the air induction port 88 without being blocked by the front wheel 6.

Further, the electric vehicle 1 according to the present embodiment includes the air exhaust port 91 provided at the rear end of the cooling air path 87 to face the rear of the electric vehicle 1, and thus the cooling efficiency of the power converter 69 is further improved by allowing air after cooling the power converter 69 to be smoothly discharged through the cooling air path 87 by using back pressure of the electric vehicle 1.

Further, the electric vehicle 1 according to the present embodiment includes the recessed portion 85 partially reducing a cross-sectional area of the cooling air path 87, and thus flow velocity is increased at a portion in the cooling air path 87 to increase cooling efficiency at the portion, whereby a circuit with a large heating value in the power converter 69, for example, is intensively cooled, and also foot-grounding capability of the electric vehicle 1 is improved.

Thus, the exterior structure 71 of the electric vehicle 1 according to the present invention is capable of efficiently and reliably cooling a power converter 69 disposed inside the exterior 12.

What is claimed is:

1. An electric vehicle comprising:
   a frame extending in a longitudinal direction of the electric vehicle;
   a power converter being long in the longitudinal direction of the electric vehicle along the frame; and
   an exterior extending in the longitudinal direction of the electric vehicle to cover the frame and the power converter, the exterior defining a cooling air path for the power converter to allow cooling air to flow through the cooling air path,
   wherein the power converter includes a plurality of heat radiation fins extending in the longitudinal direction of the electric vehicle in the cooling air path, the heat radiation fins protruding toward an inner surface of the exterior, and
   wherein the exterior includes an air induction port provided at a front end of the cooling air path to allow travelling wind to flow into the cooling air path.

2. The electric vehicle according to claim 1, wherein the air induction port is disposed at a side of a front wheel as viewed from a front of the electric vehicle, and faces forward of the electric vehicle.

3. The electric vehicle according to claim 1, wherein the exterior includes an air exhaust port provided at a rear end of the cooling air path and facing rearward of the electric vehicle to allow air to flow out from the cooling air path.

4. The electric vehicle according to claim 2, wherein the exterior includes an air exhaust port provided at a rear end of the cooling air path and facing rearward of the electric vehicle to allow air to flow out from the cooling air path.

5. The electric vehicle according to claim 1, wherein the exterior includes a recessed portion partially reducing a cross-sectional area of the cooling air path.

6. The electric vehicle according to claim 2, wherein the exterior includes a recessed portion partially reducing a cross-sectional area of the cooling air path.

7. The electric vehicle according to claim 3, wherein the exterior includes a recessed portion partially reducing a cross-sectional area of the cooling air path.

8. The electric vehicle according to claim 4, wherein the exterior includes a recessed portion partially reducing a cross-sectional area of the cooling air path.

* * * * *